3,532,709
NOVEL POLY-N-OXIDES AND THEIR
PRODUCTION
Gustav Pieper, Cologne-Stammheim, Wulf von Bonin, Opladen, and Ekkehard Grundmann, Wuppertal-Elberfeld, Germany, assignors to Farbenfabriken Bayer Aktiengesellschaft, Leverkusen, Germany, a corporation of Germany
No Drawing. Filed Sept. 20, 1966, Ser. No. 580,620
Claims priority, application Germany, Oct. 1, 1965,
F 47,335
Int. Cl. C07d 27/10
U.S. Cl. 260—326.3        4 Claims

ABSTRACT OF THE DISCLOSURE

A poly-N-oxide which is an oxidation product of an imidamine of the formula

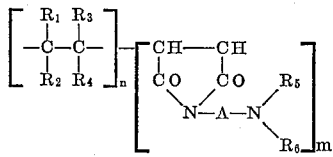

in which
$R_1$, $R_2$, $R_3$ and $R_4$ are each hydrogen, a hydrocarbon, halogen, —CN, —COOH or —CONH,
A is a bivalent organic alkylene radical or said radical containing heteroatoms of nitrogen or oxygen,
$R_5$ and $R_6$ are the same or different alkyl, aryl, alkyl or aryl having heteroatoms, or alkyl or aryl forming a part of a carboxylic or heterocyclic ring system, and
$n$ and $m$ are identical or different integers, the sum of which is between 50 and 10,000. The compounds ahe useful in the treatment of silicosis.

The present invention relates to new poly-N-oxides useful in the treatment of silicosis, and to the preparation of said poly-N-oxides by the oxidation of certain imidamines to form corresponding amine oxides.

Poly-2-vinyl-pyridine-N-oxide has become known as an agent for combating experimental silicosis in rats through the publications by H. W. Schlipköter and A. Brockhaus. Also poly-4-vinyl-pyridine-N-oxide has a certain, although substantially weaker action against silicosis, whereas numerous other polyamines or their N-oxides gave only negative results. Even poly-2-vinyl-pyridine-N-oxide has a satisfactory effect only if its molecular weight is very high, and its production and application thus present substantial technical and economic difficulties.

It has now been found that poly-N-oxides which are effective against silicosis can be produced by oxidizing imidamines of the formula

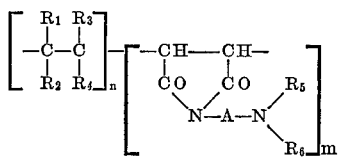

to form amine oxides.

In the above formula:
$R_1$–$R_4$ are each hydrogen, a hydrocarbon radical, halogen, —CN, —COOH, —CONH$_2$, —COOR, —OR or —OCOR;
A is a bivalent organic radical which may contain heteroatoms;

$R_5$ and $R_6$ are identical or different alkyl or aryl radicals which may contain heteroatoms or may be part of a carbocyclic or heterocyclic ring system; and
$n$ and $m$ are identical or different integers, the sum of which is between 50 and 10,000.

The imidamines used as starting material can be prepared from polymers and copolymers of maleic anhydride according to known processes by the reaction with primary-tertiary amines. Suitable compounds for this reaction are, for example, copolymers of maleic anhydride with ethylene, isobutylene, styrene, vinyl acetate and other monomers which are copolymerizable with maleic anhydride. However, these monomers should not contain any groups which give side reactions interfering with the subsequent reaction with primary-tertiary amines.

Suitable primary-tertiary amines are, for example, aliphatic diamines, such as N,N-dimethyl ethylene-diamine, N,N-diethyl propylene-diamine, 2-amino-5-diethyl-aminopentane, or aromatic amines, such as N,N-diethyl-bis-(3-aminopropyl ether), or aromatic amines, such as N,N-dimethyl-p-phenylene - diamine and p-dimethylamino-benzylamine, or also heterocyclic amines, such as N-(3-aminopropyl)-piperidine, N-(3-aminopropyl)-morpholine and aminoalkyl derivatives of pyridine. The primary-tertiary amines may also contain several tertiary amino groups in the molecule, as does, for example, N-methyl-N'-(3-amino-propyl)-piperazine, the number of N-oxide groups in the final product being thus increased. It is also possible to use mixtures of different primary-tertiary amines for the reaction with the maleic anhydride copolymer or to react several primary-tertiary amines in succession with these copolymers so that the basic polymer chain in the final product is substituted by different amine oxide radicals.

Oxidation of the imidamines to form poly-N-oxides is expediently carried out in suitable solvents using hydrogen peroxide as oxidizing agent. Suitable solvents are aqueous acids which are resistant to oxidation and an excess of acid should be avoided, if possible. Lower aliphatic alcohols, such as isopropyl alcohol, or organic acids, such as acetic acid, are, in general, also very suitable solvents, but other organic solvents, for example, dioxan or acetone, can also be used. The hydrogen peroxide is mostly used in the form of a 30% aqueous solution and can be replaced with other oxidizing agents such as per-acids or ozone, if desired.

Oxidation is usually carried out at temperatures between 20 and 100° C. If the starting materials are not soluble in aqueous alkali, the end of the reaction can be recognized by the fact that turbidity no longer occurs when the reaction mixture is diluted with ammonia. The poly-N-oxides are very readily soluble in water so that highly concentrated sterile solutions for injection or inhalation can be prepared without difficulty.

The invention is illustrated by the following non-limitative examples.

EXAMPLE 1

100 grams of the polymeric imidamine of the formula

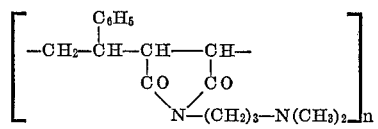

are oxidized in 1 litre of glacial acetic acid at 50° C. with 100 ml. of 30% hydrogen peroxide.

After 8 hours the poly-N-oxide is precipitated by the addition of sulphuric acid and the aqueous solution of this precipitate is purified by dialysis with tap water. There are obtained about 900 ml. of a 10% solution of the poly-N-oxide which can be used as such, after dilution to the desired concentration, for combating silicosis by subcutaneous injection of inhalation [for effect, see Table, item No. 1(a)].

If the poly-N-oxide is precipitated by the addition of acetone and some hydrochloric acid, then a colorless powder containing 7.7% N and 5.5% NO is obtained, that is to say that the preparation has a concentration of about 80% and about 70% of the tertiary N-atoms have been oxidized to N-oxide [for effect, see Table, item No. 1(b)].

Fractions of the poly-N-oxide having molecular weights between 100,000 and about 20,000 can be prepared from the same solution by fractional precipitation with acetone/hydrochloric acid [for effect, see table, item Nos. 1(c)–1(f)].

EXAMPLE 2

50 grams of the imidamine of the formula

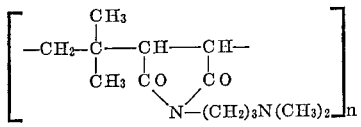

are dissolved in 500 ml. of glacial acetic acid and the solution is stirred at 50° C. for 7 hours, while adding 50 ml. of 30% hydrogen peroxide. After removing the components of low molecular weight and the solvent by a 48 hours' dialysis with tap water, there are obtained 152 g. of a 35% aqueous solution of the polyamine oxide in which, according to the result of a determination of nitrogen and NO groups, 75% of the nitrogen atoms have been oxidized to NO groups (for effect against silicosis, see Table, item No. 2).

When imidamines of the formulae

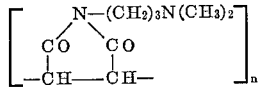

and

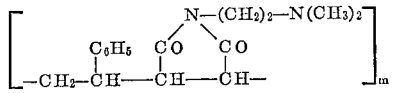

are oxidized according to the same process, poly-N-oxides are obtained, which are also effective against silicosis.

EXAMPLE 3

A solution of 50 g. of the imidamine used in Example 1 in 500 ml. of isopropyl alcohol or dioxan can be oxidized, after the addition of 50 ml. of 30% hydrogen peroxide, at 70° C. within 5 hours to form the poly-N-oxide. The reaction product is precipitated as a granular powder which is practically insoluble in the solvent and can be separated and washed with acetone. According to analysis, 100% of the tertiary amino groups have been converted into amine oxide. Yield 49 g. (92% of theory).

To test the preparations for their effect against experimental silicosis in rats, the test described by Schliphöter and Brockhaus was used [cf. Klinische Wochenschrift 39 (1961), 1182]. In the following table the effect is given as the quotient of the omentum weights (average of 10 animals) after the quartz dust has acted for one month. For evaluation of this quotient $$T/C = \frac{treated}{untreated}$$

it should be noted that an ineffective preparation has a value $T/C=1$, whereas a value $T/C=0.20$ has been determined for the optimum effect of a preparation by control tests without the application of quartz. The viscosity number was determined in a 0.9% sodium chloride solution and converted into the value for an ideal solvent.

| Number | Viscosity number | T/C |
|---|---|---|
| 1(a) | 0.23 | 0.19 |
| 1(b) | 0.23 | 0.20 |
| 1(c) | 0.25 | 0.29 |
| 1(d) | 0.21 | 0.33 |
| 1(e) | 0.15 | 0.36 |
| 1(f) | 0.12 | 0.51 |
| 2 | 0.15 | 0.36 |

What is claimed is:

1. A poly-N-oxide which is an oxidation product of an imidamine of the formula:

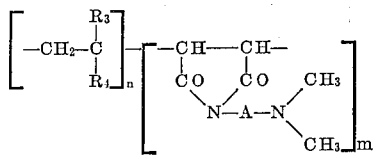

wherein $R_3$ and $R_4$ are each methyl or $R_3$ is phenyl and $R_4$ is hydrogen, A is ethylene or propylene and $n$ and $m$ are identical integers the sum of which is between 50 and 10,000.

2. A poly-N-oxide according to claim 1, wherein $R_3$ is phenyl, $R_4$ is hydrogen and A is propylene.

3. A poly-N-oxide according to claim 1, wherein $R_3$ and $R_4$ are each methyl and A is propylene.

4. A poly-N-oxide according to claim 1, wherein at least 70% up to substantially 100% of the tertiary N-atoms are in the NO oxidation form.

References Cited

UNITED STATES PATENTS

| 3,184,309 | 5/1965 | Minsk et al. | 96—29 |
| 2,500,131 | 3/1950 | Linsker | 260—279 |
| 2,518,130 | 8/1950 | Evans et al. | 260—250 |
| 2,785,170 | 3/1957 | Kagan | 260—296 |
| 2,785,171 | 3/1957 | Birkenmeyer | 260—296 |

OTHER REFERENCES

Culvenor: "Amine Oxides," Rev. of Pure & App. Chem., vol. 3, No. 88–114 (1953), pp. 83, 86–87 and 91 relied on.

ALEX MAZEL, Primary Examiner

R. V. RUSH, Assistant Examiner

U.S. Cl. X.R.

260—247.2, 268, 294, 294.3, 999